United States Patent [19]

Skahill

[11] 4,266,315
[45] May 12, 1981

[54] WINDOW WIPER STORAGE SYSTEM
[75] Inventor: Richard J. Skahill, Bettendorf, Iowa
[73] Assignee: J.I. Case Company, Racine, Wis.
[21] Appl. No.: 92,824
[22] Filed: Nov. 9, 1979
[51] Int. Cl.³ ............................................... B60S 1/24
[52] U.S. Cl. ............................. 15/250.16; 15/250.19
[58] Field of Search ........... 15/250.13, 250.16, 250.18, 15/250.19, 250.23, 250.3, 250.34; 74/75

[56] References Cited
U.S. PATENT DOCUMENTS

| | | | |
|---|---|---|---|
| 1,937,160 | 11/1933 | Oishei | 15/250.16 |
| 1,973,071 | 9/1934 | Hilton | 15/250.19 |
| 3,019,468 | 2/1962 | Hatch | 15/250.19 |
| 4,091,494 | 5/1978 | Dunhill et al. | 15/250.19 X |
| 4,144,614 | 3/1979 | Barbee | 15/250.19 X |

Primary Examiner—Peter Feldman
Attorney, Agent, or Firm—Cullen, Sloman, Cantor, Grauer, Scott & Rutherford

[57] ABSTRACT

A windshield wiper storage mechanism is disclosed which permits the operator to store the wiper blade away from contact with the windshield when it is desired to open or close the windshield panel. The wiper storage mechanism includes a rotatable storage actuator arm which is mounted inside the operator's enclosure at a position conveniently accessible to the operator. A conventional pantographic linkage causes the wiper blade to sweep a predetermined wiping area on the windshield for normal wiping operation. When the operator desires to open the windshield panel, the storage actuator arm is rotated 180°, thereby causing the wiper blade to swing away from its normal wiping position onto a storage ramp which is mounted on the frame surrounding the windshield. The wiper blade is selectively stored away from contact with the windshield which allows the operator to open or close the windshield panel without wiper blade interference.

3 Claims, 5 Drawing Figures

WINDOW WIPER STORAGE SYSTEM

BACKGROUND OF THE INVENTION

The present invention relates to a window wiper storage mechanism, and more particularly, to a mechanism for selectively moving a wiper blade from a position of contact with a windshield to a storage position away from the glass surface.

In modern tractors and other similar machines, it has become conventional to provide an operator's cab or enclosure which surrounds the operator to protect him from adverse weather conditions and to reduce the noise level from the tractor and attached powered implements. These cabs are typically frame structures with a plurality of glass panels to permit the operator overall visibility of the machine. At least one or more of the glass panels are movable upwardly and downwardly so that the operator can either completely enclose himself within the cab or open a panel, thereby permitting open air circulation.

Before the operator opens the window, it is necessary to move the spring-biased window wiper blade from a position of contact with the windshield to a stored position away from the glass surface. Prior to the present invention, the operator had no means by which to store the wiper when it was desired to open or close the windshield panel. Consequently, the wiper blade could project into the window opening and interfere with the closing of the window panel. Thus, there has been a need for a window wiper storage mechanism to be used in cabs or enclosures for tractors and similar machines.

The disadvantages of present windshield wiper mechanisms for tractor cabs, which do not have storage capability, have resulted in the window wiper storage mechanism of the present invention which provides the operator with a means by which the wiper blade can be moved from the windshield to a stored position when opening or closing a windshield panel in the cab.

SUMMARY OF THE INVENTION

In accordance with the present invention, a windshield wiper storage mechanism is provided which permits the wiper blade to be stored on the cab frame away from contact with the windshield when the operator desires to open or close the windshield panel.

The wiper storage mechanism includes a rotatable storage actuator arm which is mounted inside the cab enclosure at a position conveniently accessible to the operator. A pantographic linkage causes the wiper blade to sweep a predetermined wiping area on the windshield as is conventional. When the operator desires to lower the windshield panel to an open position, the storage actuator arm is rotated which causes the wiper blade to swing away from its normal wiping position onto a storage ramp which is mounted on the frame surrounding the windshield. That is, the wiper blade is stored in a position on the frame away from contact with the windshield which allows the operator to lower the windshield panel without wiper blade interference.

The drive shaft for the pantographic wiper blade linkage is mounted eccentrically within a sleeved hub assembly at a first position for normal wiping operation. During normal operation, a motor and drive linkage, which is secured to the wiper drive shaft, rotates the drive shaft a set amount both clockwise and counterclockwise, thereby causing the wiper blade to sweep a predetermined wiping area on the windshield. When the operator desires to lower the windshield, he rotates the storage actuator arm, which is fixed to the sleeved hub, thereby rotating the hub within its sleeve and displacing the wiper blade drive shaft to a second eccentric position. Simultaneously therewith, the motor drive linkage restrains the wiper drive link which causes the drive shaft to rotate more than its normal set amount, thereby forcing the wiper blade onto a storage ramp which is fixed to the frame surrounding the windshield and out of contact with the windshield.

The rotatable storage actuator arm comprises a handle which is mounted inside the operator's cab at a position conveniently accessible to the operator. The handle includes a free end which is pivotable 180° between a first position which permits normal wiping operation of the wiper blade and a second position which forces the blade onto the storage ramp. The other end of the handle is fixed to the wiper drive shaft hub to rotate the hub and eccentric drive shaft within its sleeve in response to pivotal movement of the handle free end.

During normal operation, the free end of the handle is releasably locked in its first position which fixes the hub and eccentric drive shaft for normal wiping action of the blade within a predetermined wiping area on the windshield. The operator releases the free end of the handle and rotates it 180° to its second position for storing the wiper blade. As the handle rotates to its second position, the hub and drive shaft rotate therewith which causes the blade to swing onto the storage ramp because the wiper drive arm is restrained by the motor drive linkage. The free end of the handle is also releasably locked at its second position to hold the wiper blade stored and away from the windshield while the windshield panel is opened or closed. Thus, the present window wiper storage mechanism provides a simple, yet effective, means for storing the wiper blade thereby preventing wiper interference while the windshield panel is being opened or closed.

Other advantages and meritorious features of the present invention will be more fully understood from the following description of the preferred embodiment, the appended claims, and the drawings, a brief description of which follows.

DESCRIPTION OF THE PREFERRED EMBODIMENT

A preferred embodiment of the windshield wiper storage mechanism made in accordance with the teachings of the present invention is illustrated in FIG. 1–5.

Figure 1:
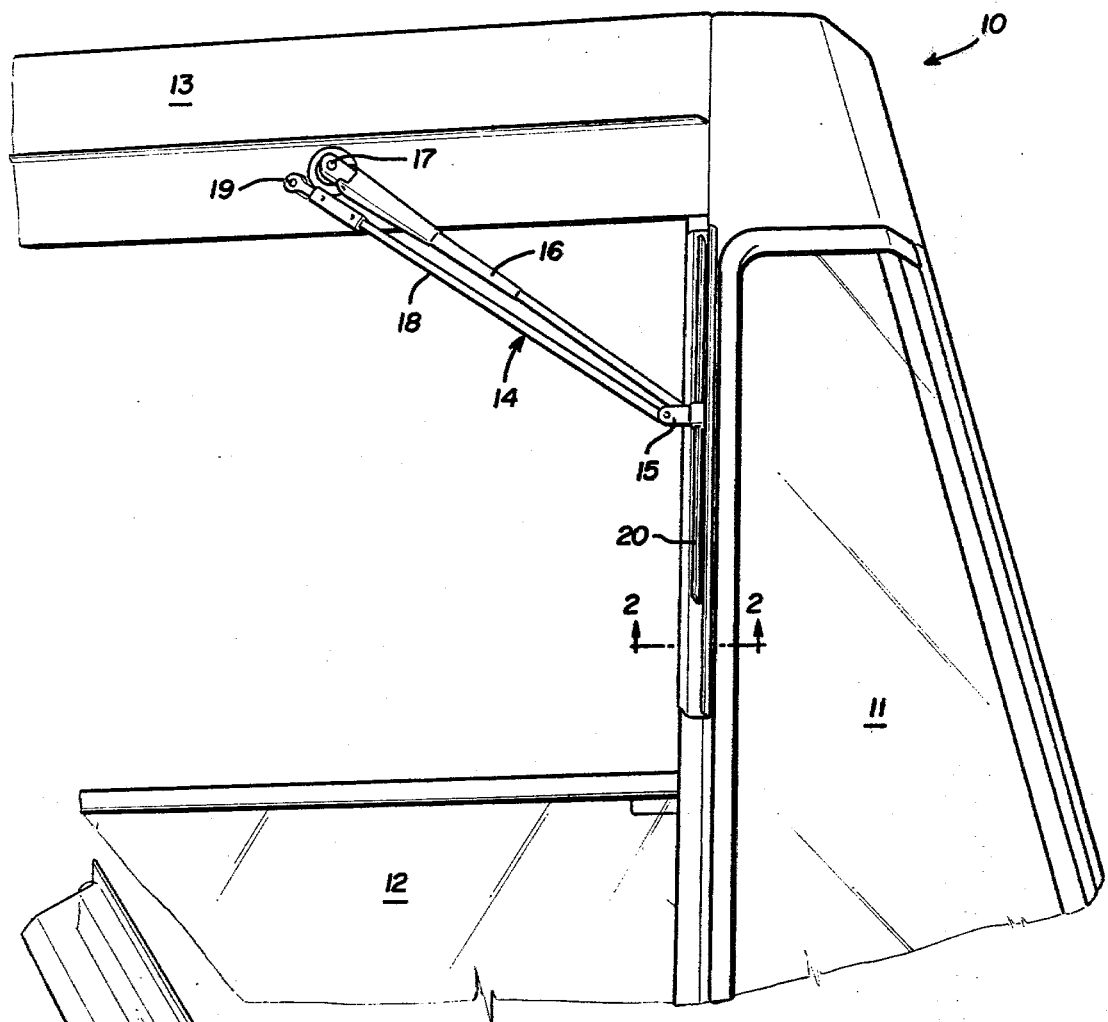
FIG. 1 is a partial front elevational view of a tractor cab or enclosure illustrating the wiper mechanism in its stored position in accordance with the teachings of the present invention.
Figure 3:
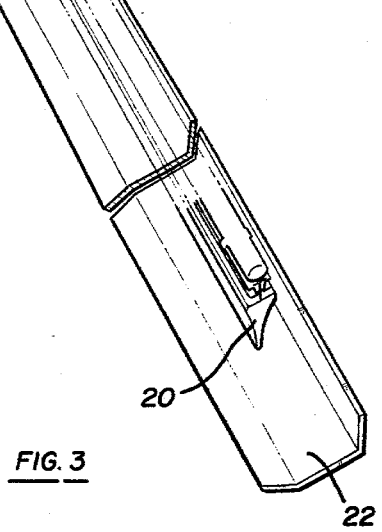
FIG. 3 is a perspective view of the storage ramp and wiper blade in its stored position.
Figure 2:
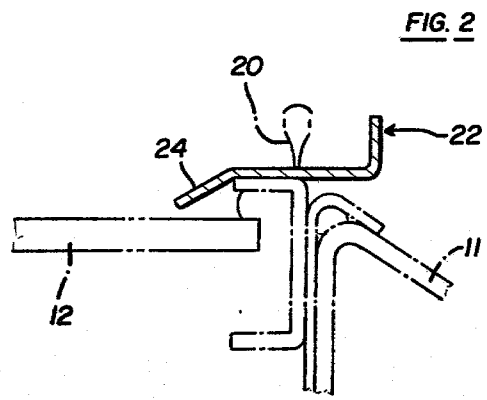
FIG. 2 is a cross-sectional view taken along line 2—2 in FIG. 1 illustrating the storage ramp which is mounted to the frame surrounding the windshield.

The operator's cab or enclosure 10, which surrounds the operator to protect him from adverse weather conditions and to reduce the noise level from the tractor and attached powered implements, is illustrated in FIG. 1. Cab 10 includes a frame structure 13 with a plurality of glass panels 11, 12 to permit the operator overall visibility of the machine. At least one or more of the glass panels 12 are movable upwardly and downwardly so that the operator can either completely enclose himself within the cab or open a panel 12, thereby permitting open air circulation.

Figure 4:
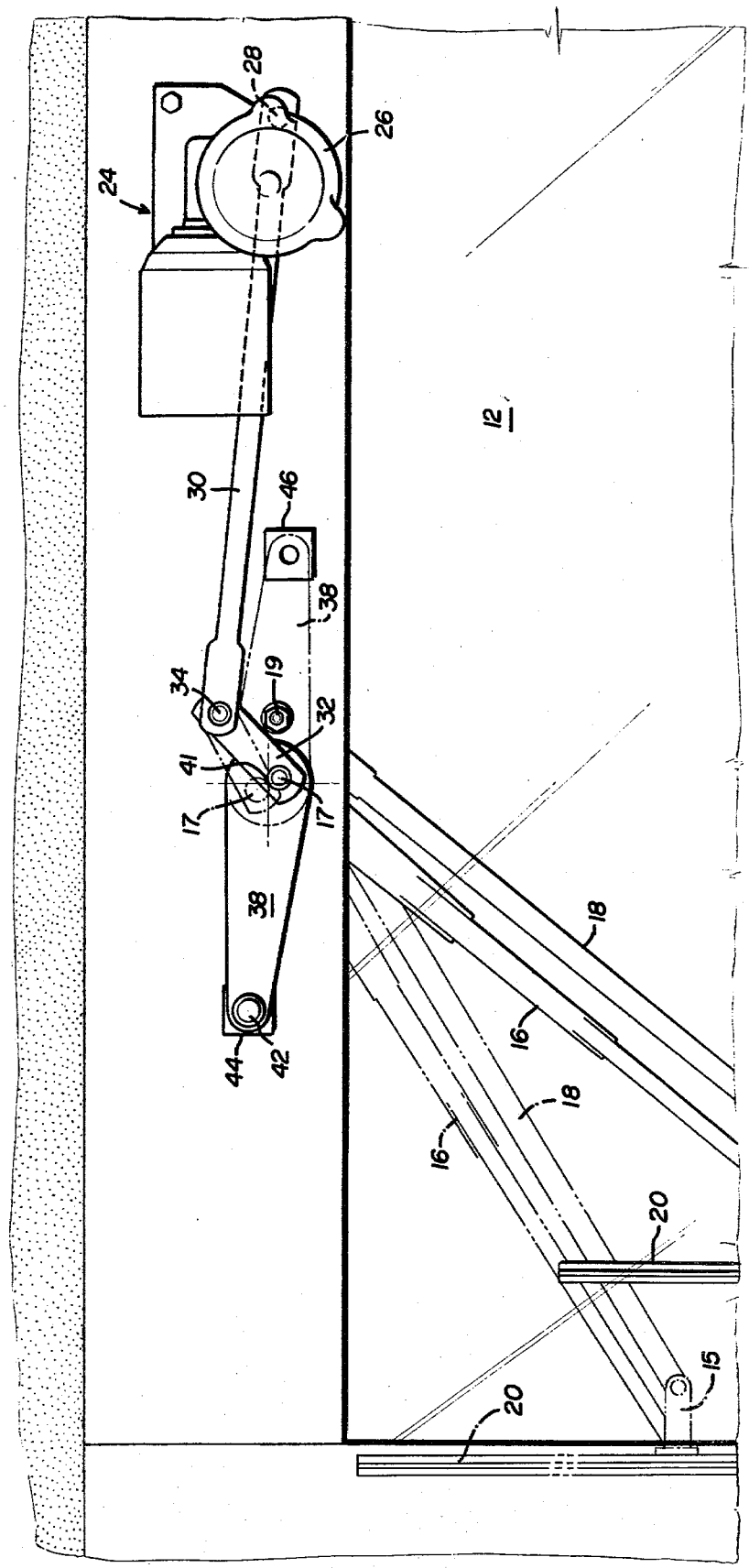
FIG. 4 is a side elevational view of the windshield wiper storage mechanism as seen from inside the operator's cab or enclosure.

A pantographic wiper assembly 14 causes the wiper blade 20 to sweep a predetermined wiping area on the windwhield 12 as is conventional. Wiper assembly 14 includes a parallelogram linkage 15, 16, 18, a pivot shaft 19, and a drive shaft 17. Referring to FIG. 4, motor 24 rotates wheel 26 and reciprocates drive link 30 which is eccentrically pinned to wheel 26 at 28. The free end of drive link 30 is pivotally mounted to one end of wiper drive link 32 by pin 34, and the opposite end of wiper drive link 32 is fixed to wiper drive shaft 17. During normal wiping operation, motor 24 and drive linkage 30, 32 rotate drive shaft 17 a set amount both clockwise and counter-clockwise, thereby causing wiper blade 20 to sweep a predetermined wiping area on the windshield as illustrated in the solid line position of wiper blade 20 in FIG. 4.

Before the operator can move windshield panel 12 downwardly to its open position, it is necessary to move the spring-biased window wiper blade 20 from a position of contact with the windshield as illustrated in FIG. 4 to a stored position away from the glass surface as illustrated in FIG. 1. Prior to the present invention, the operator had no means by which to store the wiper when it was necessary to open or close the windshield panel 12.

In accordance with the present invention, a windshield wiper storage mechanism is provided which permits the wiper blade to be stored on a storage ramp 22 which is fixed to the frame 13 surrounding the windshield 12. Storage ramp 22 includes an inclined portion 24 which assists the departure of the wiper blade from the glass surface 12, and it also includes an upstanding portion 22 which limits the outward lateral movement of the wiper blade. When the operator desires to lower the windshield panel 12 to an open position, wiper blade 20 is caused to swing laterally away from its normal wiping position illustrated in FIG. 4 and onto storage ramp 22. That is, the wiper blade 20 is stored in a position on frame 13 away from contact with the windshield 12 which allows the operator to lower the windshield panel without wiper blade interference.

Figure 5:
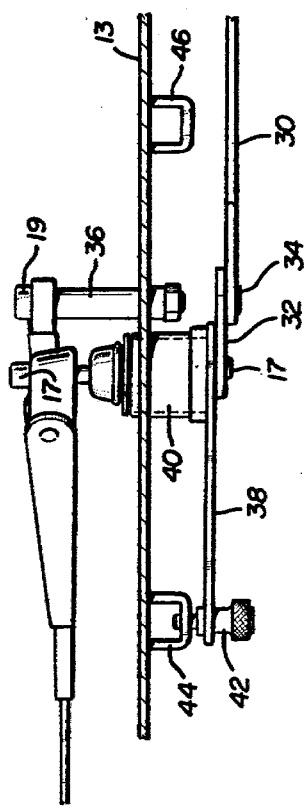
FIG. 5 is a partial top plan view of the wiper storage mechanism illustrated in FIG. 4.

Referring to FIGS. 4 and 5, pivot shaft 19 is mounted to frame 13 for fixed pivotal movement by pivot mounting 36. The drive shaft 17 for the pantographic wiper blade assembly 14 is mounted eccentrically within a sleeved hub assembly 40 which has a central longitudinal axis 41 (FIG. 4). A rotatable storage actuator arm 38 is fixed at one of its ends to the hub within assembly 40 as illustrated in FIG. 5. During normal wiping operation, the wiper drive shaft 17 is mounted within sleeved hub assembly 40 at the solid line position illustrated in FIG. 4. Motor 24 and drive linkage 30, 32 rotate drive shaft 17 a set amount both clockwise and counter-clockwise, thereby causing wiper blade 20 to sweep a predetermined wiping area on windshield 12.

When the operator desires to lower the windshield, he rotates the storage actuator arm 180° thereby rotating the hub within its sleeve and displacing the wiper blade drive shaft 17 to a second eccentric position as illustrated in phantom lines in FIG. 4. Simultaneously therewith, motor drive linkage 30 restrains wiper drive link 32 which causes wiper drive link 32 and drive shaft 17 to rotate more than their normal set amount, thereby forcing wiper blade 20 onto storage ramp 22 as illustrated in phantom lines in FIG. 4.

The rotatable storage actuator arm 38 comprises a handle which is mounted inside the operator's cab at a position accessible to the operator. The handle includes a free end which is pivotable 180° between a first position (i.e., solid line position FIG. 4) which permits normal wiping operation of the wiper blade 20 and a second position (i.e. phantom line position FIG. 4) which forces the blade onto storage ramp 22. The other end of the handle is fixed to the wiper drive shaft hub to rotate the hub and eccentric drive shaft 17 within their sleeve in response to pivotal movement of the handle free end.

During normal operation, the free end of handle 38 is releasably locked in its first position by spring biased pin 42 and latch 44. This fixes the hub 40 and eccentric drive shaft 17 for normal wiping action of the blade within a predetermined wiping area on the windshield as illustrated in solid lines in FIG. 4. The operator releases the free end of the handle and rotates its 180° to its second position for storing the wiper blade 20. As the handle rotates to its second position, the hub and drive shaft 17 rotate therewith which causes blade 20 to swing onto the storage ramp 22 because the wiper drive arm 32 is restrained by motor drive link 30. The free end of the handle is also releasably locked at its second position by latch 46 to hold the wiper blade stored away from the windshield while the windshield panel 12 is opened or closed. Thus, the present wiper storage mechanism provides a simple, yet effective, means for storing the wiper blade 20 thereby preventing wiper interference while the windshield panel is being opened or closed.

It will be apparent to those skilled in the art that the foregoing disclosure is exemplary in nature rather than limiting, the invention being limited only by the appended claims.

I claim:

1. A windshield wiper storage mechanism for an enclosure having at least one movable windshield panel and a frame surrounding said movable panel, said windshield wiper storage mechanism comprising:

a wiper blade assembly mounted to said frame, said wiper blade assembly including a wiper blade and a wiper drive shaft for causing said blade to sweep laterally within a predetermined wiping area on said windshield panel;

a motor drive assembly mounted to said frame for powering said wiper blade assembly, said motor drive assembly including a motor and reciprocating drive means mounted to said motor, a wiper drive link being mounted between said reciprocating drive means and said wiper drive shaft, said motor and drive means rotating said drive link and said drive shaft a set amount clockwise and counter-clockwise thereby causing said wiper blade to sweep laterally within said predetermined wiping area on said windshield during normal wiping operation;

said drive shaft being mounted eccentrically at a first position within a hub and sleeve assembly for normal wiping operation;

a rotatable storage actuator arm having one end fixed to said hub and a second end selectively movable between a first position which permits normal wiping operation of the wiper blade and a second position which moves said wiper blade laterally away from contact with said windshield;

a storage ramp mounted to said frame which surrounds the windshield;

said actuator arm being movable to said second position when it is desired to store said wiper blade, and said hub and eccentric drive shaft being movable therewith within said sleeve such that said drive shaft assumes a second eccentric position, said reciprocating drive means causing said drive link and drive shaft to rotate more than said set amount when said actuator arm is moved to said second position whereby said wiper blade is swung laterally onto said storage ramp out of contact with said windshield panel.

2. The windshield wiper storage mechanism as defined in claim 1 including means for selectively locking said storage actuator arm at said first and second positions.

3. In a windshield wiper drive mechanism for use in an enclosure having at least one movable windshield panel, said windshield wiper drive mechanism including a motor and drive means mounted to said motor, a wiper blade assembly including a wiper blade and a drive shaft, said drive means being connected to said drive shaft for rotating said drive shaft a set amount both clockwise and counter-clockwise thereby causing said wiper blade to sweep laterally within a predetermined wiping area on said windshield panel during normal wiping operation, the improvement comprising:

said drive shaft being mounted eccentrically at a first position within a hub and sleeve assembly for normal wiping operation;

actuator means being mounted to said hub for selectively rotating said hub and drive shaft such that said drive shaft assumes a second eccentric position, said drive means causing said drive shaft to rotate more than said set amount when said actuator means is rotated whereby said wiper blade is swung laterally onto said frame and out of contact with said windshield panel.

* * * * *